United States Patent

[11] 3,634,668

[72] Inventor Harry L. Shaffer
    Lynnfield, Mass.
[21] Appl. No. 42,239
[22] Filed June 1, 1970
[45] Patented Jan. 11, 1972
[73] Assignee Sylvania Electric Products Inc.

[54] LOG SPECTRUM DECODING UTILIZING SYMMETRY
6 Claims, 5 Drawing Figs.

[52] U.S. Cl. .................................................. 235/156,
    181/0.5 R, 179/1 SA
[51] Int. Cl. ....................................................... G06f 7/38,
    G06f 15/34
[50] Field of Search .............................................. 235/156,
    152; 181/0.5 R; 324/77 G, 77 H; 340/15.5 DP;
    179/1 SA, 1 VC

[56] References Cited
    UNITED STATES PATENTS
3,517,173  6/1970  Gilmartin, Jr. et al. ........  235/156
3,544,775  12/1970  Bergland et al. ..............  235/156 UX

OTHER REFERENCES

R. Shively, A Digital Processor to Generate Spectra in Real Time " IEEE Trans. on Computers," Vol. C– 17, No. 5, May 1968, pp. 485– 491.

A. Oppenheim, Speech Spectrograms Using the Fast Fourier Transform, " IEEE Spectrum," Aug. 1970, pp. 57– 62.

Primary Examiner—Malcolm A. Morrison
Assistant Examiner—David H. Malzahn
Attorneys—Norman J. O'Malley, Elmer J. Nealon and Robert T. Orner

ABSTRACT: A log spectrum decoder for performing the Discrete Fourier Transform (DFT) of a set of samples of an input signal employs first and second counter devices, the output value of the first counter device being related to the number of samples of the input signal and the output value of the second counter device determining the number of samples in an output signal. A multiplier circuit multiplies each of the input samples by a plurality of voltage signals collectively representing a cosine function. The number of voltage signals are related to the number of output signals of the second counting device. The resultant product signals are directed simultaneously to a first predetermined storage location in a memory device and through a function generator to a second predetermined storage location in the memory device.

The product of each odd-numbered input sample and the sampled cosine function signals is inverted in the function generator and stored in the second predetermined storage location so as to form a series of signals having odd symmetry about the last output signal of the second counting device. Similarly, the product of each even-numbered input sample and the sampled cosine function is directed through the function generator without inversion to form a series of signals having even function symmetry about the last output signal of the second counting means. The series of signals stored in the memory device are directed to an accumulator circuit which adds, on a corresponding storage location basis, the most recent calculated series of signals to the accumulated sum of the previous signals. When the last input sample has been processed, the accumulated series of signals represents the logarithm of spectrum magnitudes of the input signal.

INVENTOR
HARRY L. SHAFFER

LOG SPECTRUM DECODING UTILIZING SYMMETRY

BACKGROUND OF THE INVENTION

This invention relates to processors and in particular to digital processors for taking the Fourier transform of a signal representing the Fourier transform of the log spectrum magnitudes (FTLSM) of a predetermined signal. The processor or log spectrum decoder disclosed herein is particularly useful in digital vocoders which extract voice and vocal tract information of a speech signal from a series of signals which represent the FTLSM of the input signal.

It is well known that the Fast Fourier Transform (FFT) method of calculating the Discrete Fourier Transform (DFT) of some set of samples ($N$ samples), requires fewer multipliers to calculate the DFT than the direct method of solution of the DFT equation:

$$S\left(\frac{j \cdot SR}{N}\right) = \sum_{k=0}^{N-1} s\left(\frac{k}{SR}\right) e^{-i2\pi\left(\frac{j \cdot SR}{N}\right)\left(\frac{k}{SR}\right)}$$

$$j = 0, 1, 2, \ldots, N-1 \quad (1)$$

Equation (1) is the DFT equation for the transform of some sampled function(s) where $SR$ = sampling rate in cycles/second
$N$ = number of samples to be transformed
$s(k/SR)$ = samples of function(s) taken at a uniform sampling rate $SR$
$S(j \cdot SR/N)$ = transformed sequence evaluated at the frequencies $(j \cdot SR)/N$ $$e^{-i2\pi\left(\frac{j \cdot SR}{N}\right)\left(\frac{k}{SR}\right)} = \text{Fourier transformed kernel}$$

$k, j$ = running counters assuming all integer values from $0 - (N-1)$
$i = \sqrt{-1}$ The calculation of equation (1) by the direct method should require $N^2$ complex multiplications. The FFT method for evaluating equation (1) requires only $N \log_r N$ complex multiplier, where $r$ is the radix used to represent the counter values $j, k$ in solving equation (1) by the FFT method.

A straight comparison of the number of multipliers required by the direct method vs. the FFT method is shown in equation (2):

Multiply Ratio = $(N \log_r N)/N^2$
= $(\log_r N)/N$ (2)

For large $N$, the multiply ratio calculated using equation (2) is essentially proportional to the true time savings realized by solving equation (1) using the FFT method vs. the direct method.

However, for small values of $N$ ($N \leq 32$), the multiply ratio (2) does not truly represent the time savings. This is due to the fact that the time saving realized by using the FFT method is due to a proper combining of samples which then share a complex multiplier. This proper combining of samples requires a procedure to calculate the address of the appropriate samples to be combined at each step of the FFT process. For small values of $N$, the amount of calculation required to determine which samples are to be combined, during each step of the FFT process, cannot be neglected. Therefore, there exists a lower limit of $N$, below which the FFT procedure does not yield any computational time savings.

SUMMARY OF THE INVENTION

A signal processor according to the present invention computes the logarithm of the spectrum magnitudes of a predetermined signal, for example, a speech signal, from an input signal including a predetermined number of coefficient signals representing the Fourier transform of the logarithm of the spectrum magnitudes of the speech signal. The signal processor or spectrum decoder includes a function storage means to store a predetermined number of signals representing samples from a predetermined function such as a cosine function and a means for selecting certain ones of the predetermined number of signals from the function storage means. A means for multiplying coupled to the function storage means multiples each of the predetermined number of coefficient signals by selected ones of the predetermined number of signals stored in the function storage means to generate a number of product signals for each of the coefficient signals.

A storage means having a first input port coupled to accumulates multiplying means has a predetermined number of storage locations and is operative to store the product signals for each coefficient signal in certain ones of the storage locations accumulator a first predetermined arrangement. Coupled between the means for multiplying and a second input port of the storage means is a function generator means which is operative in response to each of certain ones of the coefficient signals to store the associated product signals in a second predetermined arrangement in the storage locations of the storage means and is operative in response to each of the remaining ones of the coefficient signals to negate and store their resultant product signals in the second predetermined arrangement within the storage means.

An accumulating means coupled to the storage means adds and accumulates on a storage location basis the sum of the product signals stored in that location for each of the input coefficient signals. The output signal of the accumulator includes a plurality of product signals representing the logarithm of spectrum magnitudes of the predetermined signal.

The data processor or spectrum decoder according to the present invention yields a plurality, $j$, of output signals in response to a plurality $k$, of input coefficient signals where $j$ is not constrained to equal $k$. The plurality $j$ of output signals represents the DFT of the plurality $k$ of input coefficient signals. Also, the transform method and apparatus according to the present invention can be configured to yield either one or both the Discrete Cosine Fourier Transform (DCFT) and/or Discrete Sign Fourier Transform (DSFT) parts of the DFT. For special cases where only a DCFT or a DSFT of the sampled input data sequence is required, the transform method according to the present invention is efficient in that only the required part of the DFT of the input signals is calculated.

DETAILED DESCRIPTION OF THE DRAWINGS

The construction and operation of a log spectrum decoder according to the present invention will be more fully understood from the following detailed description taken in conjunction with the accompanying drawings in which.

DETAILED DESCRIPTION OF THE INVENTION

Mathematical Description of the Spectrum Decoder

The specific problem to be described by way of example is a nonsquare (i.e., $j_{max} \neq k_{max}$) DCFT. Twenty-one samples of the FTLSM of a speech input signal are to have their DCFT calculated in accordance with equation (3).

$$\text{Log}\left|V\left(\frac{j\cdot SR}{N}\right)\right| = \sum_{k=0}^{20} C\left(\frac{k}{SR}\right) \cos 2\pi\left(\frac{k}{SR}\right)\left(\frac{j\cdot SR}{N}\right)$$
$$j=4,8,12,\ldots,128$$

$$= \sum_{k=0}^{20} C\left(\frac{k}{SR}\right) \cos \frac{2\pi}{N} k\cdot j$$
$$j=4,8,12,\ldots,128 \quad (3)$$

where $C(k/SR)$ = sample of the FTLSM of a record of speech input of length $N$ (256) samples $\text{Log}\,|V(j\cdot SR/N)|$ Sample of Fourier transform of the data sequence made up of samples of $C(k/SR)$. This function is the log of the magnitude of the vocal tract transfer function.

The direct method of evaluating equation (3) would require that for each value of $j$ the summation on $k$ be evaluated. This procedure would sequentially calculate samples of log $|V(j\cdot SR/N)|$.

Since the sampled data sequence consisting of samples $C(k/SR)$ is, for example, a function of some prior sampled input speech analysis intervals, in general no consistent symmetry properties could be expected to exist for the sampled data sequence consisting of the samples $C(k/SR)$. This is not true however for the orthogonal set of cosine functions (cos $(2\pi/N\,j\cdot k)$ used in calculating the function log $|V(j\cdot SR/N)|$.

The samples of the cosine function required to perform the transform are evaluated by solving for all possible values of the argument of the cosine function, i.e., $$\text{Required cosine samples} = (2\pi/N)(j\cdot k) \quad (4)$$
$$j=4,8,12,\ldots,128$$
$$k=0,1,2,\ldots,20$$

If a counter sequence for $j$ is rewritten with a 4 factored out, equation (4) can be rewritten as:

$$\text{Required cosine samples} = \frac{2\pi}{(N/4)} j\cdot k \quad (5)$$
$$j=1,2,3,\ldots,32$$
$$k=0,1,2,\ldots,20$$

Therefore, from equations (4) and (5), it can be seen that the cosine samples required to perform the transform can come from a cosine sampled $N$ times/cycle, where the counter $j$ is allowed to increment in steps of 4, or from a cosine sampled only $N/4$ times/cycle with counter $j$ being incremented by 1. In either case, the samples of the cosine that are used are identical. For practical reasons, the form shown in equation (5) yields a simpler implementation and is therefore used in this example.

The lowest frequency cosine of the orthogonal set that is sampled $N$ times/cycle and the $jk$ product acts to resample this cosine using only the sample values that are a multiple of 4 or effectively only $N/4$ samples of the $N$ sample cosine are used.

In general, a function $f_c(\theta)$ is said to be an even function if $f_c(\theta)=f_c(-\theta)$ and is symmetric not only with respect to the vertical axis passing through the origin ($\theta=0$) but also with respect to all vertical lines (samples) at $\theta=n\pi$ ($n=\pm 1, \pm 2, \ldots$). A function $f_s(\theta)$ is said to be an odd function if $f_s(\theta)=-f_s(-\theta)$ and is antisymmetric with respect to all vertical lines (samples at $\theta=n\pi$ where $n=\pm 1, \pm 2, \ldots$).

It can be shown that the cosine function is even symmetric about the $n/2^{nd}$ ($128_{th}$) sample. This is true of all the cosines comprising the orthogonal set and therefore the full DCFT over $N$ samples (when the sequence of samples $C(k/SR)$ is made even) would also be an even function. This can also be shown with the aid of some fundamental trigonometric identities. Assume that $k$ is a counter representing the harmonic ($k_{th}$) of some orthogonal set and $j$ is a sample counter. If the cosines are symmetric about $N/2$, the following identity should be true for $j \leq N/2$.

$$\cos (2\pi/N)Kj = \cos (2\pi/N)(kN-kj) \quad (6)$$

i.e., samples symmetrically located with respect to $N/2$ should have identical values:

$$\cos (2\pi/N)(kN-kj)$$
$$= \cos 2\pi k \cos (2\pi/N)(-kj) -$$
$$\sin 2\pi k \sin (2\pi/N)(-kj) \quad (7)$$
$$= \cos 2\pi k \cos (2\pi/N)(-kj)$$
$$= (1) \cos (2\pi/N)kj$$

The right-hand side of the identity relation, equation (6), has been verified by the substitutions performed in equation (7). It is this symmetry of the cosine functions which made it possible to limit $k$ at the maximum value of 20 and not form an even symmetric function over an $N$ sample interval and also limit the maximum $J$ value to $N/2$ (128) instead of $N$ (256).

The savings in multiply operations that are significant when performing a transform using this method are due to the additional symmetries that exist about the point at $N/4$. The identity shown in equation (8) will be used to describe the additional symmetries. If $k$ is again assumed as a harmonic number and $j$ restricted to $j \leq N/4$, the following identity describes the symmetries of the orthogonal cosine functions about the $j=N/4$ point:

$$\cos \frac{2\pi}{N}jk = \cos \frac{2\pi}{N}\left(\frac{kN}{2}-jk\right)$$
$$= \cos k\pi \cos \left(\frac{-2\pi}{N}jk\right) - \sin k\pi \sin \left(-\frac{2\pi}{N}jk\right)$$
$$= (-1)^k \cos \frac{2\pi}{N}jk \quad (8)$$

The solution of the identity of equation (8) shows that the even-numbered harmonics ($k=0,2,\ldots,\text{even}$) are even symmetries about $N/4$. For the odd harmonics ($k=1,3,\ldots,\text{odd}$), the cosine exhibits odd symmetry. It is this set of symmetries which allows an additional savings of one-half the multipliers in calculating log $|V(j\cdot SR/N|$ over the nonsymmetric interval $j=4,8,12,\ldots,128$.

The symmetry relation shown in equation (8) is particularly useful because it involves all the orthogonal cosine functions used in this transform method. Additional symmetries, of some of the cosine functions, could be shown to exist, but in these cases the symmetry properties do not span the complete set of orthogonal cosine functions. Equation (9) will show the partial symmetry that exists about the $N/8^{th}$ sample.

$$\cos (2\pi/N)jk = \cos (2\pi/N)(kN/4-jk) \quad (9)$$
$$\cos (k\pi/2) \cos (2\pi/N)jk - \sin (\pi/2)k \sin -(2\pi/N)jk$$
$$= (-1)^{k/2} \cos (2\pi/N)jk$$
$$k=0,2,4,6,8,\ldots$$
$$= (-1)^{(k-1)/2} \sin (2\pi/N)jk$$
$$k=1,3,5,7,\ldots$$

For this case every even numbered cosine function has even and odd symmetry about the $N/8^{th}$ sample; however, the odd-numbered cosine functions do not exhibit any symmetry about $N/8$ (seen by the fact that the symmetrical sample value is not a cosine). A procedure could be developed to save the multiply operations associated with the even-numbered cosine functions for this particular symmetry condition. However, the implementation of the efficient transform described herein does not take advantage of any symmetries of the orthogonal cosine function set that does not apply to all the cosine functions comprising the set.

Figure 1:
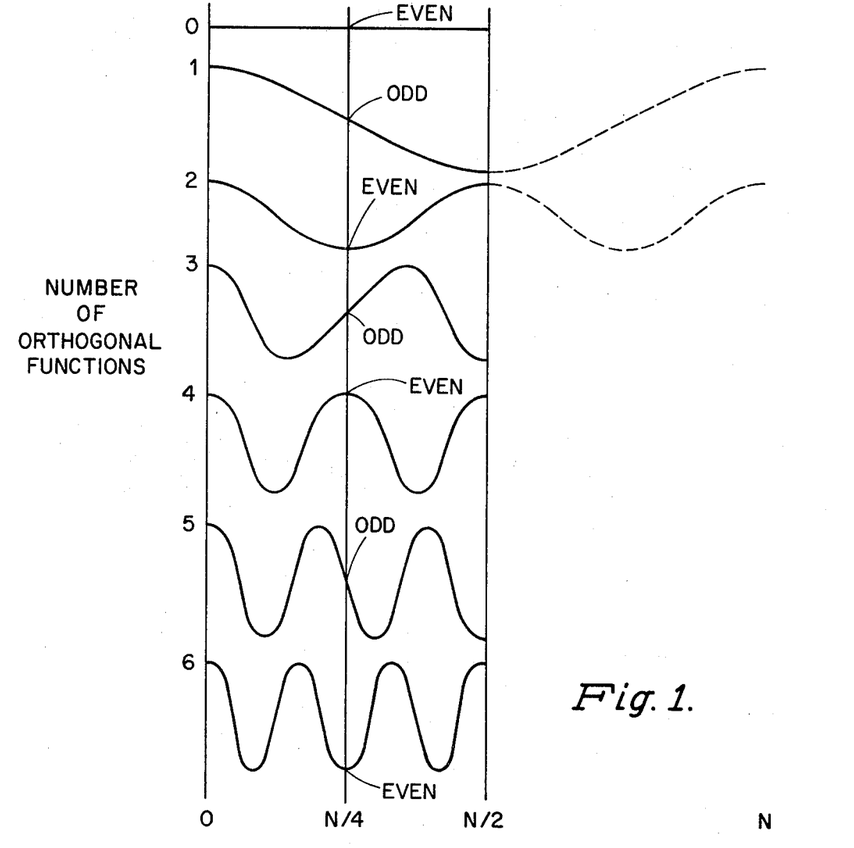
FIG. 1 is a plurality of waveforms useful in explaining the theory of operation of a spectrum decoder according to the invention.

FIG. 1 shows the first seven orthogonal cosine functions (0-6). From FIG. 1 it can easily be seen that all the members of the orthogonal set are even symmetric about the $N/2^{nd}$ sample. In addition, each of the members of the orthogonal set are symmetric about the $N/4^{th}$ sample where even-numbered members of the set are even symmetric and odd-numbered members are odd symmetric.

The total transform is given as $$\text{Log}\left|V\left(\frac{j\cdot SR}{N}\right)\right| = \sum_{k=0}^{20} V_k(j)$$
$$j=4, 8, 12, \ldots, N/2 \quad (10)$$

In performing the actual transform the $jk$ products are considered to be Modulo–$N/4$; therefore, all the cosine sample values that are equipped to perform this efficient transform can be conveniently obtained from a table of cosine values that contain $N/4$ samples spanning one cycle of a cosine function. This is readily seen by examining the cosine function $$\cos 2\pi \left(\frac{jk}{N/4}\right) \quad (11)$$

For the case $jk \leq N/4$, the cosine argument uses samples of a cosine taken in one cycle of the cosine function. For the case $jk \geq N/4$ the cosine can be rewritten as $$\cos 2\pi \left(\frac{jk}{N/4} - I\right) \quad (12)$$

$I$ is the integer portion of the $jk$ ($N/4$) fraction. Using trigonometric identities to reduce the argument in equation (12) yields $$\cos 2\pi \left(\frac{jk}{N/4} - I\right)$$
$$= \cos \frac{2\pi jk}{N/4} \cos(-2\pi I) + \sin \frac{2\pi jk}{N/4} \sin(-2\pi I)$$
$$= \cos \frac{2\pi jk}{N/4} \quad (13)$$

Therefore, all the $jk$ products generated by the solution of the transform equation (3) can be treated as $jk$ Modulo–$N/4$ values, and the correct cosine sample value required by the transform can be obtained from the cosine storage of one cycle of a cosine function having been sampled $N/4$ times/cycle.

Log Spectrum Decoder Apparatus

Figure 2A:
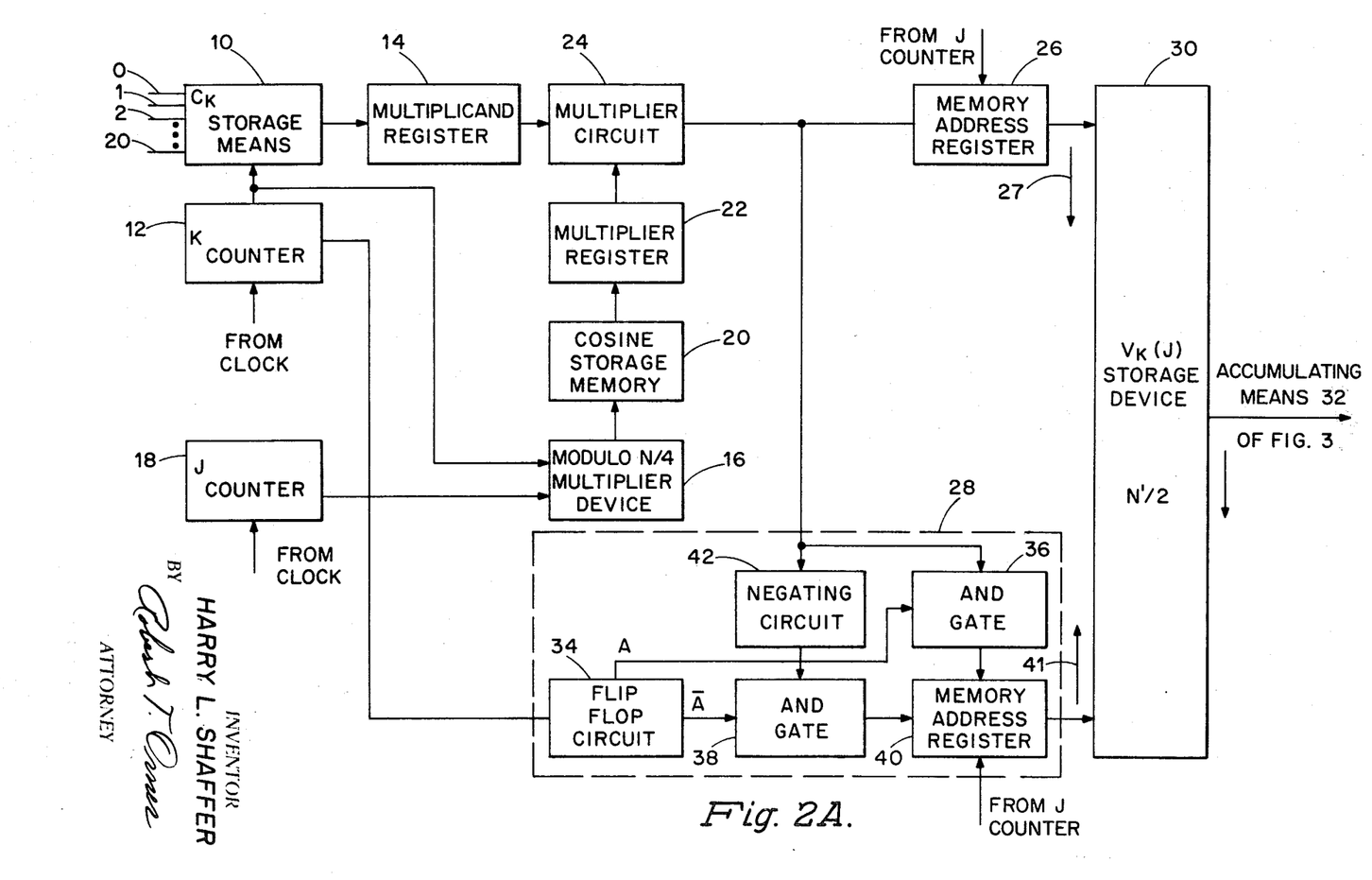
FIGS. 2A and 2B are block diagrams of an embodiment of the spectrum decoder according to the present invention.
Figure 2B:
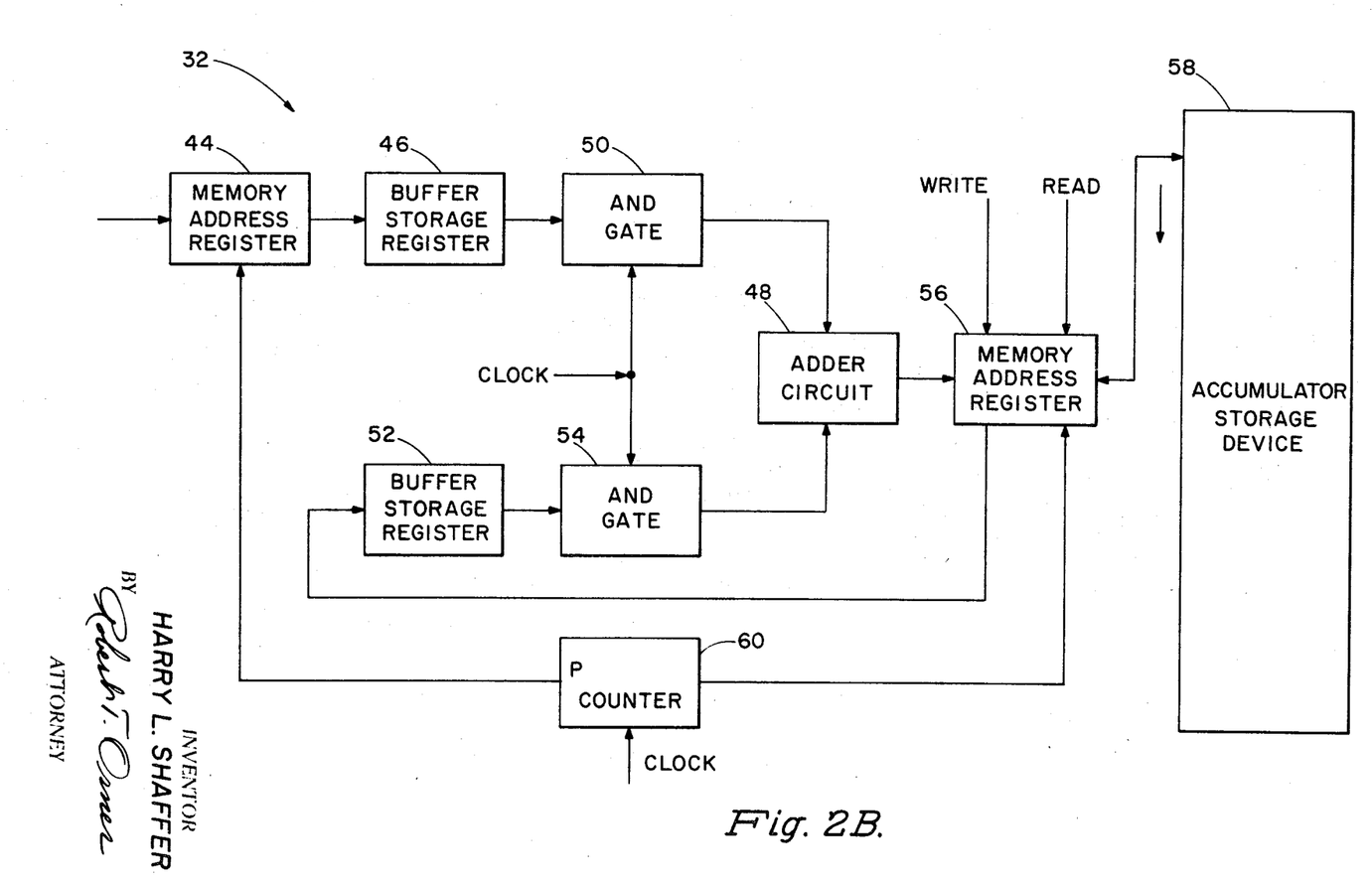
Figure 4:
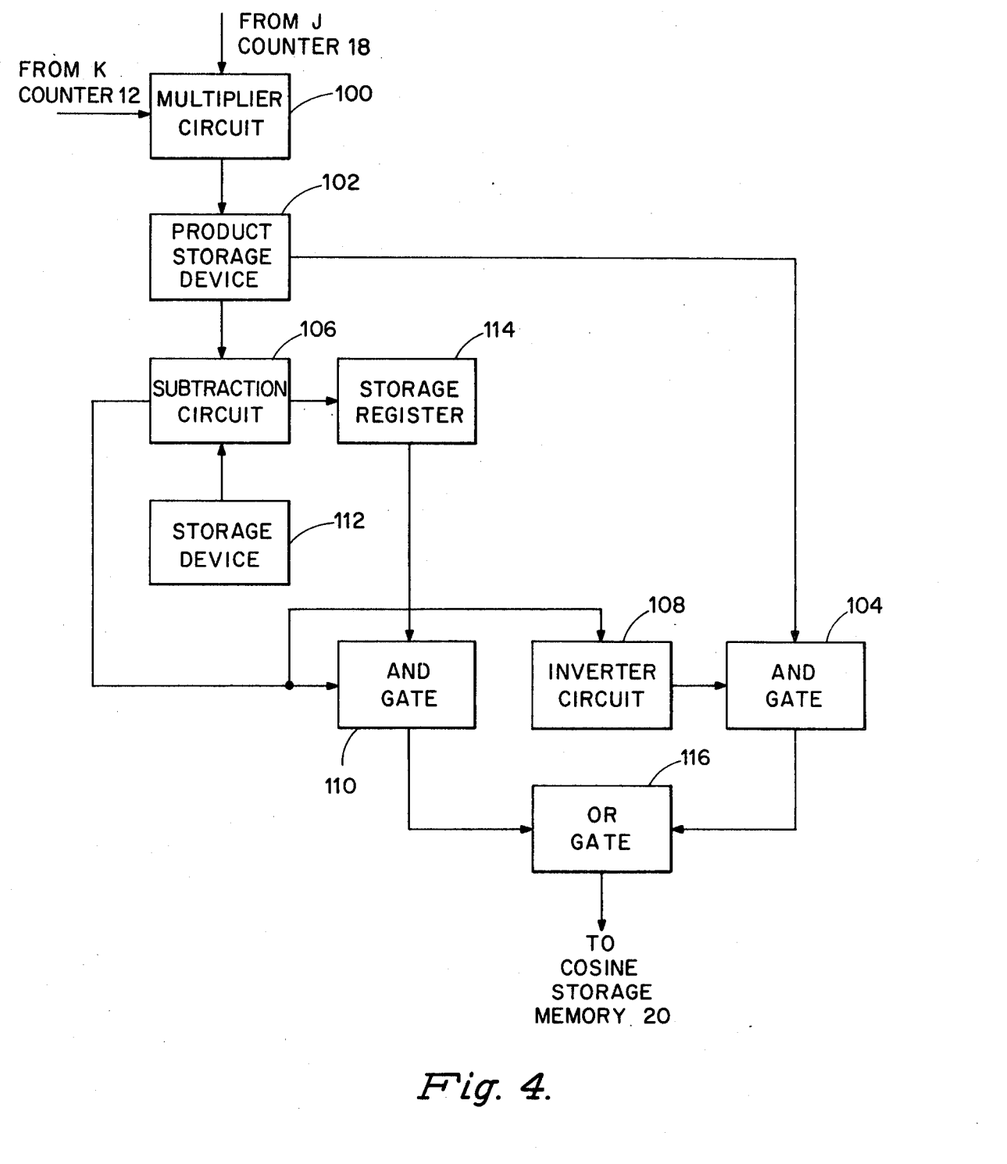
FIG. 4 is a block diagram of an embodiment of a Modulo-N/4 multiplier device employed in the spectrum decoder of FIGS. 2A and 2B.

An embodiment of a log spectrum decoder according to the present invention is shown in FIGS. 2A, 2B and 4 and includes a first storage means 10, well known in the art, having a first input connection coupled to a source (not shown) of input signals, a second input connection coupled to a first counter means, for example, the K-counter 12, and an output connection coupled to a multiplicand register 14. A Modulo–$N/4$ multiplier device 16 (to be discussed in detail hereinafter) has input connections from the K-counter 12 and a second counter means such as the J-counter 18 and an output connection to function storage means such as the cosine storage memory 20, the output connection of which is coupled to a multiplier register 22.

A digital multiplier circuit 24, well known in the art, has input connections from the multiplicand register 14 and the multiplier register 22 and an output connection coupled to a first memory address register 26 and to a function generator 28. A storage device 30, such as an addressable core memory, has a first input connection from the memory address register 26 and a second input connection from the function generator 28 and an output connection to an accumulating means 32, an embodiment of which is shown in FIG. 2B.

The function generator 28 includes a flip-flop circuit 34 having an input connection coupled to the K-counter 12 and first and second output connections coupled, respectively, to first and second gating means such as the AND-gates 36 and 38. The AND-gate 36 has a second input connection from the multiplier circuit 24 and an output connection coupled to a second memory address register 40. A negating circuit 42 has an input connection coupled to the multiplier circuit 24 and an output connection coupled through the AND-gate 38 to the second memory address register 40.

The accumulating means 32 of FIG. 2B includes a third memory address register 44 having an input connection coupled to the storage device 30 and an output connection connected to a first buffer storage register 46. An adder circuit 48 has a first input connection coupled to the first buffer storage register 46 via a third gating means such as the AND-gate 50 and a second input connection to a second buffer storage register 52 via a fourth gating means such as the AND-gate 54. A fourth memory address register 56 has input connections from the adder circuit 48 and a second storage device 58 and output connections coupled to the second buffer storage register 52 and the second storage device 58. A third counter means such as the counter 60 is coupled to the third and fourth memory address registers 44 and 56.

The operation of the log spectrum decoder is explained assuming an input signal comprising a predetermined number, for example 21, of sample signals $C_k$ representing the Fourier transform of the log of the spectrum magnitudes of a speech signal. The 21 sample signals $C_0$ through $C_{20}$ of the input signal govern the limits of summation $$\sum_{k=0}^{20} \text{ of Equation (3)}.$$

The K-counter 12 then is a simple five-bit binary counter which counts from zero to 20. For each count of the K-counter 12, the J-counter 18 is incremented $N'(1/4) = 64/4 = 16$, where $N' = N/4$). Thus 16 multiply operations by the multiplier circuit 24 are required to calculate the transform contribution of a single $C_k$ coefficient over the interval $1 \leq J \leq N/4$. The J-counter 18 is incremented by unity (1) on each increment, as shown in equation (5). This means that the cosine storage memory 20 will contain a plurality of signals representing one cycle of a cosine function which has been sampled to an accuracy of 64 samples/cycle.

In response to each signal from the K-counter 12 a certain one of the input signal samples $C_k$ is transferred to the multiplicand register 14. Also the current value of the K-counter 12 output signal is multiplied by each of the 16 output signals of the J-counter 18 in the Modulo–$N/4$ multiplier, and the resultant JK product signal determines which of the cosine values stored in the cosine storage memory 20 is transferred to the multiplier register 22. The multiplier circuit 24 multiplies the contents ($C_k$) of the multiplicand register 14 by the contents of the multiplier register 22 and transfers the product signal to a predetermined location in the storage device 30 via the first memory address register 26.

For each of the 20 input sample signals $C_k$ transferred to the multiplicand register 14 by the K-counter signal, there are 16 samples of the stored cosine function sequentially multiplied with each of the $C_k$ samples by the multiplier circuit 24 to form 16 product signals. Each of the 16 product signals are directed to separate addressable memory locations within the storage device 30 by the first memory address register 26 which is incremented in the direction of the arrow 27 by a signal from the J-counter 18.

As seen by equation (5), the output signal is to be transformed into 32 samples, and as seen in FIG. 1, the even-numbered cosine orthogonal functions (0,2,4,6,...) are even symmetric about the $N/4$ point, and the odd-numbered cosine orthogonal functions (1, 3, 5, ...) are odd symmetric about the $N/4$ point. To convert the 16 product signals stored in the storage device 30 into the requisite 32 samples having the correct symmetry, the function generator 28 is employed. Each time the K-counter 12 is incremented, a trigger pulse is directed to the flip-flop circuit 34. When the K-counter output signal is an even number (0,2,4,...), the output signal A of the flip-flop circuit 34 opens the AND-gate 36 and the complementary output signal $\bar{A}$ inhibits the AND-gate 38. Under this condition, each of the 16 product signals in addition to being directed to one of the specific storage locations 1 through 16 of the storage device 30 is also directed through the AND-gate 36 to the second memory address register 40 which directs each of the product signals to a second storage location to form an even function having symmetry about the $16^{th}$ product signal.

Figure 3:
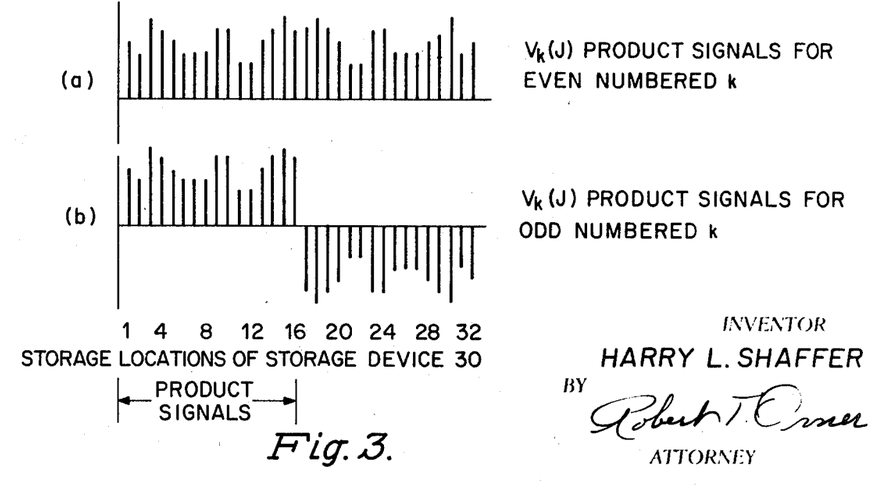
FIG. 3 is a set of waveforms useful in explaining the operation of the embodiment of FIGS. 2A and 2B.

Referring to waveform (a) of FIG. 3, an example of a series of product signals and their corresponding memory locations in the storage device 30 are shown. When the first product signal is computed by the multiplier circuit 24, it is directed via the first memory address register 26 to the first memory location and to the $32^{nd}$ memory location via the AND-gate 36 and the second memory address register 40. The J-counter is then incremented, and the second product signal computed by the multiplier circuit 24 is directed to the second memory location by the first memory address register which has been updated one position by a signal from the J-counter 18. The second product signal is also directed to the $31^{st}$ memory location via the AND-gate 36 and the second memory address register 40 which also has been updated in the direction of the arrow 41 by the J-counter. The operation continues in this manner until the 16 product signals have been computed and stored in the $16^{th}$ and $17^{th}$ locations. The 32 product signals are then transferred to the accumulating means for further processing.

The K-counter is then incremented one unit which transfers another coefficient signal $C_k$ to the multiplicand register 14, provides a new $k$ value to the Modulo-$N$/4 multiplier device 16 and sets the flip-flop circuit 34 such that the AND-gate 38 is now opened and the AND-gate 36 is inhibited. The first product signal for the new $K$ value, computed by the multiplier circuit 24, is directed through the memory address register 26 to the first memory location in the storage device 30 and through the combination of the negating circuit 42, the AND-gate 38 and the second memory address register 40 to the $32^{nd}$ memory location. The effect of the negating circuit is to change the sign bit of the product signal. The remaining 15 product signals are computed for the particular $C_k$ signal and stored in their appropriate memory locations to form a series of signals having odd symmetry about the 16 samples (see waveform (b) of FIG. 3).

It is the function of the accumulating means 32 to add vectorially, in accordance with equation (10), each product signal stored in a particular memory location of the storage device 30 for the 21 values of the input $C_k$ coefficients. Assume, for purpose of explanation, that the first 32 product signals (those computed for the input coefficient $C_0$) are stored in 32 addressable memory locations in the accumulator storage device 58. The manner in which the $C_0$ product signals were stored in the accumulator storage device will become apparent as the operation of the accumulating means 32 is explained. Assume further that the 32 product signals for the input coefficient $C_1$ have been computed and are stored in their appropriate memory locations in the memory device 30.

The third memory address register 44 in response to a signal from the P-counter 60 reads or transfers the product signal from the first memory location of the storage device 30 into the buffer storage register 46. Also, in response to the first P-counter signal, the first product signal of the $C_0$ coefficient is transferred by the fourth memory address register 56 to the second buffer storage register 52. In response to a clock pulse from a source not shown, the first product signals of the first and second input coefficient signals $C_0$ and $C_1$ are passed by the respective AND-gates 50 and 54 to the adder circuit 48. The sum of the product signals is then read back into the first memory location of the accumulator storage device 58 by the fourth memory address register 56.

The P-counter is then incremented, and the second product signals of the first and second input coefficients $C_0$ and $C_1$ are transferred from their respective memory locations to the adder circuit 14. The signal representing the sum of the second product signal is then transferred to the second memory location of the accumulator storage device 58. The remaining 30 product signals in the storage device 30 are processed in a similar manner and the contents of the accumulator storage device 58 is the accumulated sum of JK products for $K=2$. The K-counter is then incremented and the entire process is repeated.

When the 21 input signal coefficients $C_0$ through $C_{20}$ have been processed, the signal contents of the accumulator storage device are equal to the log spectrum magnitudes of the input speech signal in accordance with equation (10).

Modulo-$N$/4 Multiplier

The theory of the Modulo-$N/b^1$4 multiplier, which addresses the function storage means, is based on the use of a positional number system. A positional number system is described as a system where some base number (known as the radix) is raised to successive integral powers and is the implicit multiplier of a number sequence of integers that represent a number. Equation (14) shows a general format.

$$a_k{}^b k...a_3 b^3 + a_2 b^2 + a_1 b^1 + a_0 b^0 \quad (14)$$

In the standard positional form of representing a number, the radix $b$ is raised successively to larger integer powers. Each position of the positional number representation has provisions for a general multiplier value $a_k$. The number of distinct symbols used to represent numbers in this type of system is $b$ where they define the null element (0) up to the count $(b-1)$. The modulus of such a positional number system is defined as the maximum value that one of the $a_k$ coefficients can assume and is given as $(b-1)$.

If some periodic structure is to be examined where the relation $$f(k_o) = f(k_p T^v + k_{p-1} T^{v-1} + \ldots k_1 T + k_0)$$

where $k_p = 0, 1, 2,\ldots$
$v = 0, 1, 2,\ldots$
$k_o = 0, 1, 2,\ldots T-1$
$T =$ period of process is valid, then the argument $(k_p T^v + k_{p-1} T^{v-1} \ldots k_1 T + k_0)$ can be replaced by the value $k_o$ and the same function obtained. If the radix of the number system is chosen to be equal to the number ($N$) of samples in a period of the process, then the determination of any specific value of the process can be obtained from knowledge of the $k_o$ term only (i.e., the Modulo-$T$ portion of the number). It is this property that makes the calculation of cosine samples according to equation (5), instead of equation (4), the most efficient number system to implement. Besides greatly simplifying the table look-up procedure, the J-counter is incremented simply by a one each time instead of by a count of four.

An embodiment of a Modulo-$N$/4 multiplier using binary arithmetic is shown in FIG. 4 and includes a digital multiplier circuit 100 having input connections coupled to the J- and K-counters 12 and 18 of FIG. 2 and an output connection coupled to a product storage device 102. The product storage device 102 has output connections coupled to a first AND-gate 104 and a subtraction circuit 106. The subtraction circuit 106 has a second input connection from a storage device 112 and output connections to a second AND-gate 110, an inverter circuit 108 and to a storage register 114, the output connection of which is coupled to the second AND-gate 110. An OR-gate 116 has input connections coupled to the output connections of the first and second AND-gates 104 and 110 respectively.

The two output signals from the J- and K-counters 18 and 12 are multiplied together by the multiplier circuit 100 to obtain a Modulo-$N$ product signal. A number, $v$, of the lower order bits of the modulation product signal is transferred to the product storage device 102. The number, $v$, is the smallest integer that satisfies the expression $2^v > (N-1)$. The value of the $v$ lower order bits is subtracted from the predetermined value of the modulus signal ($N-1$) stored in the storage device 112, and the difference is transferred to the storage register 114. The sign bit is transferred from the subtractor circuit 106 to both the first AND-gate 104 via the inverter circuit 108 and the second AND-gate 110.

If the sign bit is positive (the JK product $> N-1$), the second AND-gate 110 is enabled and the first AND-gate 104 is disabled transferring the difference signal in the storage register 114 through the second AND-gate 110 and the OR-gate 116 to address a predetermined value of of the cosine function stored in the cosine storage memory 20. If the sign bit is negative (JK product signal is less than $N-1$), the first AND gate is enabled and the second AND-gate 110 is disabled transferring the JK product signal through the first AND-gate 104 and the OR-gate 116 to address the appropriate value of the cosine function stored in the cosine storage memory 20.

What has been shown and described is a method and apparatus for decoding a spectrum signal including a plurality of coefficient signals representing the Fourier transform of the logarithm of spectrum magnitudes of a predetermined signal. Various modifications and changes may be made therein without departing from the invention as defined by the appended claims.

What is claimed is:

1. A signal processor apparatus for computing the logarithm of the spectrum magnitudes of a predetermined signal from an input signal including a predetermined number of coefficient signals representing the Fourier transform of the logarithm of the spectrum magnitudes of the predetermined signal, said processor apparatus comprising:

function storage means operative to store in addressable locations a predetermined number of signals representing a predetermined function;

means coupled to said function storage means for selecting certain ones of said predetermined number of signals representing a predetermined function;

multiplying means coupled to said function storage means for multiplying each of the predetermined number of the coefficient signals by the selected ones of said predetermined number of signals stored in said function storage means to generate a predetermined number of product signals;

storage means having a first input port coupled to said multiplying means and a second input port and having a predetermined number of storage locations, said storage means being operative to store in certain ones of said predetermined number of storage locations said predetermined product signals in a first predetermined arrangement;

function generator means coupled between the common juncture of said first input port of said storage means and said multiplying means and the second input port of said storage means and being operative in response to each of certain ones of said coefficient signals to store the associated product signals of each of said certain ones in a second predetermined arrangement in the storage locations of said storage means and being operative in response to each of the remaining ones of said coefficient signals to negate and to store the product signals for each of said remaining ones in the second predetermined arrangement in storage locations of said predetermined number of storage locations of said storage means; and accumulating means coupled to said storage means and being operative to add and accumulate on a storage location basis the sum of the product signals stored in each storage location of said storage means to generate an output signal including a plurality of signals, each of said signals being the sum of the product signals stored in a particular location of said storage means.

2. A signal processor apparatus according to claim 1 wherein said means for selecting includes:

first counter means operative to generate a series of output signals representing a first predetermined numerical count over a first predetermined time interval;

second counter means operative to generate a series of output signals representing a second predetermined numerical count over a second predetermined time interval, said series of output signals of said second counter means occurring for each numerical count of said first counter means; and multiplier means having an input connection coupled to said first and second counter means and an output connection coupled to said function storage means and being operative to generate an output signal, the value of which is proportional to the product of the output signals of said first and second counter means, each of said output signals corresponding to a specific addressable location in said function storage means.

3. A signal processor apparatus according to claim 2 wherein said function generator means comprises:

a flip-flop circuit having an input connection coupled to said first counter means and first and second output connections and being operative in response to certain ones of the output signals of said first counter means to generate an output signal of a first polarity at said first output connection and an output signal of a second polarity at said second output connection and being operative in response to the remaining ones of the output signals of said first counter means to generate an output signal of said second polarity at said first output connections and an output signal of said first polarity at said second output connection;

first gating means having a first input connection coupled to said common juncture of said first input port of said storage means and said multiplying means, a second input signal coupled to the first output connection of said flip-flop circuit, and an output connection and being operative in response to the first polarity signal of said flip-flop circuit to transfer the product signals from said multiplying means to its output connection and being operative in response to said second polarity signal to inhibit the transfer;

negating circuit means having an input connection coupled to the first input connection of said first gating means and being operative to change the sign of the product signal from said multiplying means;

second gating means having a first input connection coupled to said negating circuit means, a second input connection coupled to the second output connection of said flip-flop circuit, and an output connection and being operative in response to said first polarity signal of said flip-flop circuit to transfer the sign-changed product signals from said negating circuit to its output connection and being operative in response to said second polarity signal of said flip-flop circuit to inhibit the transfer; and storage address means having a first input connection coupled to the output connections of said first and second gating means, a second input connection coupled to said second counter means and an output connection coupled to the second input port of said storage means and being operative in response to an input signal from said second counter means to store alternately the output signals of said first and second signals from said first and second gating means in said second predetermined arrangement in the storage locations of said storage means.

4. A signal processor apparatus according to claim 3 wherein said accumulating means comprises:

an addressable accumulating storage device having an input/output port and a predetermined number of storage locations corresponding to the storage locations in said storage means and being operative to transfer data to and from said predetermined storage locations;

third counter means operative to generate over a third predetermined interval a predetermined number of output signals corresponding to the number of storage locations in said addressable accumulating storage device;

adder circuit having first and second input connections and an output connection and being operative to provide an output signal at said output connection equal to the sum of the signals at said first and second input connections;

first address means having a first input connection coupled to said storage means, a second input connection coupled to said third counter means and an output connection coupled to the first input connection of said adder circuit and being operative in response to a signal from said third counter means to transfer the product signals stored in a particular location in said storage means to the first input connection of said adder circuit; and second address means coupled between the second input connection and the output connection of said adder circuit and said addressable accumulating storage device and having an input connection coupled to said third counter means, said second address means being operative in response to each signal from the third counter means to transfer to the adder circuit the data stored in the particular storage location of said addressable accumulating storage device corresponding to the storage location in said storage means of the data at said first connection of said adder circuit, and being operative to transfer the resulting sum signal at the adder circuit output connection to the particular storage location in said addressable accumulating storage device vacated by the data at the second input connection of the adder circuit.

5. A log spectrum decoder apparatus for spectrum decoding an input signal comprising a predetermined number of signal samples representing the Fourier transform of the logarithm of spectrum magnitudes of a predetermined signal, said spectrum decoder including the combination of;

first counter means operative to generate a first predetermined number of output signals having a first predetermined time interval between successive output signals:

second counter means operative to generate a second predetermined number of output signals over a second predetermined time interval, said second predetermined number of output signals being generated once during each first predetermined time interval;

first multiplier means coupled to said first and second counter means and being operative to generate an output signal proportional to the product of the output signals of said first and second counter means whereby the number of product signals generated for each of the output signals of said first counter means corresponds to the second predetermined number of the output signals of said second counter means;

function storage means having an input connection coupled to said first multiplier means and an output connection and being operative to store in specific locations a third predetermined number of signals, representing a predetermined mathematical function, said function storage means being operative in response to the magnitude of the product signal of said first multiplier means to transfer one of said third predetermined number of signals to its output terminal from a specific location corresponding to the magnitude of the product signal of said first multiplier means;

input signal storage means coupled to said first counter means and having an output connection and being operative in response to each of said first predetermined number of output signals to transfer to its output connection one of said signal samples of said input electrical signal;

second multiplier means having input connections coupled to said input signal storage means and to said function storage means and being operative to multiply each of the predetermined number of signal samples of the input electrical signal by each one of said third predetermined number of signals from said function storage means to generate product signals the number of which are related to the second predetermined number of output signals of said second counter means;

product storage means having a plurality of storage locations the number of which is equal to at least twice the second predetermined number of output signals of said second counting means;

first memory address means having a first input connection coupled to said second multiplier means, a second input connection coupled to said second counter means and an output connection coupled to said product storage means and being operative to store each product signal in said product storage means in a predetermined location determined by the signal from said second counter means;

function generator means coupled between said second multiplier means and said product storage means and having input connections from said first and second counter means and being operative in response to certain ones of said predetermined number of the output signals of said first counting means to transfer directly to a second predetermined location in said product storage means the output signals of said second multiplier means to thereby produce a first function having a predetermined symmetry and being operative in response to the other ones of said predetermined number of output signals of said first counter means to inert the output signals of said second multiplier means and to transfer the inverted output signals to the second predetermined locations in said product storage means to thereby produce a second function having a second predetermined symmetry, said second predetermined location being determined by said second counting means; and accumulator means coupled to said product storage means and being operative to add the product signals stored in each of said first and second predetermined locations of said product storage means to the product signals stored in the same locations for each count of said first counter means and to store the sum of the product signals for each of the first and second predetermined locations, said sum of the product signals representing the logarithm of spectrum magnitudes of the input electrical signal.

6. In a data-processing system a machine-implemented method of generating a set of output signals representing the logarithm of the spectrum magnitudes of a predetermined signal from a set of input signals representing the Fourier transform of the logarithm of spectrum magnitudes of said predetermined signal, said method comprising the machine steps of:

multiplying each one of the set of input signals by a first predetermined number of electrical signals representing a mathematical function to generate a first predetermined number of electrical product signals including a sign bit;

arranging, for each one of the set of electrical input signals, said first predetermined number of product signals in a first predetermined arrangement, each of said product signals having a certain position within the first predetermined arrangement;

arranging, for each one of the set of electrical input signals, said first predetermined number of product signals in a second predetermined arrangement so as to form with said first predetermined arrangement a series of product signals having symmetry about the last product signal; and combining each series of product signals produced from each set of electrical input signals on a position basis such that all the product signals arranged in a particular position within the first and second arrangement are combined whereby the series of product signals represents the logarithm of the spectrum magnitudes of the predetermined signal.

* * * * *